(12) United States Patent
Partouche-Sebban et al.

(10) Patent No.: US 8,368,026 B2
(45) Date of Patent: Feb. 5, 2013

(54) SCINTILLATOR FOR AN IMAGING DEVICE, SCINTILLATOR MODULE, IMAGING DEVICE WITH SUCH A SCINTILLATOR AND METHOD OF MANUFACTURING A SCINTILLATOR

(75) Inventors: David Partouche-Sebban, Bruyeres le Chatel (FR); Isabelle Abraham, Corbreuse (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 58 days.

(21) Appl. No.: 12/681,860

(22) PCT Filed: Oct. 8, 2008

(86) PCT No.: PCT/FR2008/051822
§ 371 (c)(1),
(2), (4) Date: Apr. 6, 2010

(87) PCT Pub. No.: WO2009/053612
PCT Pub. Date: Apr. 30, 2009

(65) Prior Publication Data
US 2010/0230605 A1    Sep. 16, 2010

(30) Foreign Application Priority Data
Oct. 10, 2007   (FR) .................................... 07 58202

(51) Int. Cl.
*G01T 1/20* (2006.01)
(52) U.S. Cl. ...................................... 250/368
(58) Field of Classification Search .................. 250/366, 250/368, 483.1
See application file for complete search history.

(56) References Cited

U.S. PATENT DOCUMENTS

| | | | |
|---|---|---|---|
| 3,344,276 A | | 9/1967 | Balding |
| 4,298,800 A | * | 11/1981 | Goldman ......................... 378/19 |
| 4,533,489 A | * | 8/1985 | Utts et al. .................. 252/301.17 |
| 4,560,882 A | * | 12/1985 | Nelson et al. ............... 250/487.1 |
| 4,982,096 A | * | 1/1991 | Fujii et al. ...................... 250/367 |
| 5,329,124 A | | 7/1994 | Yamamoto et al. |
| 5,418,377 A | * | 5/1995 | Tran et al. .................. 250/483.1 |
| 5,430,298 A | * | 7/1995 | Possin et al. ............. 250/370.11 |

(Continued)

FOREIGN PATENT DOCUMENTS

| | | |
|---|---|---|
| DE | 198 49 772 A1 | 5/1999 |
| DE | 101 54 522 A1 | 7/2002 |

(Continued)

OTHER PUBLICATIONS

International Search Report Dated Apr. 15, 2009 (5 pgs).

(Continued)

*Primary Examiner* — Kiho Kim
(74) *Attorney, Agent, or Firm* — Brinks Hofer Gilson & Lione

(57) ABSTRACT

A scintillator for an imaging device includes a plate made of a material capable of emitting photons according to an incident radiation. The scintillator further includes at least one block of a second material capable of emitting photons according to the incident radiation. The plate and the block are assembled via the edge of the plate by connecting means that absorbs all or some of the photons emitted by the plate and the block. A scintillator module and an imaging device with such a scintillator, and a method of manufacturing a scintillator are also disclosed.

24 Claims, 6 Drawing Sheets

U.S. PATENT DOCUMENTS

| | | | |
|---|---|---|---|
| 5,753,918 | A | 5/1998 | Pandelisev |
| 5,773,829 | A | 6/1998 | Iwanczyk et al. |
| 6,031,892 | A | 2/2000 | Karellas |
| 6,285,739 | B1 | 9/2001 | Rudin et al. |
| 6,344,649 | B2 | 2/2002 | Riedner et al. |
| 6,541,773 | B1 * | 4/2003 | Iwabuchi et al. ........ 250/370.11 |
| 6,737,103 | B2 | 5/2004 | Polichar et al. |
| 6,881,960 | B2 | 4/2005 | Schreiner et al. |
| 7,057,187 | B1 | 6/2006 | Yun et al. |
| 7,112,797 | B2 | 9/2006 | Hoge |
| 7,238,945 | B2 | 7/2007 | Hoffman et al. |
| 2002/0190214 | A1 | 12/2002 | Wieczorek et al. |
| 2003/0021376 | A1 * | 1/2003 | Smith .......................... 378/98.8 |
| 2004/0136493 | A1 | 7/2004 | Konno et al. |
| 2004/0155197 | A1 | 8/2004 | Tonami et al. |
| 2005/0104000 | A1 | 5/2005 | Kindem et al. |

FOREIGN PATENT DOCUMENTS

| | | |
|---|---|---|
| EP | 0 413 043 A1 | 2/1991 |
| EP | 1 754 981 A1 | 2/2007 |
| FR | 2 625 332 A1 | 6/1989 |
| FR | 2 657 694 A1 | 8/1991 |
| FR | 2 874 021 A1 | 2/2006 |
| GB | 1489652 | 10/1977 |
| GB | 2 034 148 A | 5/1980 |
| GB | 2 167 279 A | 5/1986 |

OTHER PUBLICATIONS

Quillin and Aedy, "*A pixelated BGO scintillator array for high energy flash radiography*", Nuclear Symposium Conference Record, IEEE 2004, vol. 2, pp. 794-797.

Samant et al., "*A high quantum efficiency prototype video based portal imaging system*", published in Journal of X-ray Science and Technology 14 (2006, pp. 161-175).

Stromswold D.C., "*Comparison of Sodium Iodide, Cesium Iodide, and Bismuth Germanate Scintillation Detectors for Borehole Gamma-Ray Logging*", 1980 Nuclear Science Symposium, 1980. 1980 Symposium on Nuclear Power Systems Nov. 5-7, 1980 Orlando, FL, USA, vol. ns-28, No. 1.

Office Action from counterpart Russian Application No. 2010118563/28, dated Aug. 31, 2012, 14 pages.

* cited by examiner

SCINTILLATOR FOR AN IMAGING DEVICE, SCINTILLATOR MODULE, IMAGING DEVICE WITH SUCH A SCINTILLATOR AND METHOD OF MANUFACTURING A SCINTILLATOR

PRIORITY CLAIM

This application is a nationalization under 35 U.S.C. 371 of PCT Application No. PCT/FR2008/051822, filed Oct. 8, 2008, which claims priority to French Patent Application No. 0758202, filed Oct. 10, 2007, and incorporated by reference herein.

TECHNICAL FIELD

The present invention concerns a scintillator for an imaging device, a scintillator module, an imaging device with such a scintillator and a method of manufacturing a scintillator.

BACKGROUND

Radiographic imaging devices (also known as radiographic imagers) are generally used to radiograph an object or to produce the image of a radiating source. They consequently find applications in non-destructive testing, radiography and tomography of objects or sources of radiation, gammagraphy, neutronography and in any imaging technique using X, beta, gamma, protons, neutrons, and the like. ionizing radiation. These devices can address numerous requirements running from the medical field to astronomy and to the inspection of packages for safe transport.

Hereinafter the term radiation (or ray) is used to refer to all ionizing radiation that can be used for imaging: X, beta, gamma, protons, neutrons, and the like. Similarly, the expression radiographic imaging will be used regardless of the type of radiation concerned.

Generally speaking, radiography of an object is effected by placing the object between a source of radiation and a radiographic imager. As for the imaging of a source of radiation, it is effected by placing a collimator between the source and the radiographic imager. The collimator can simply be a small hole and the image of the source is then formed on the imager, but this collimator can be more complex (for example in the case of multi-hole coded openings, slots, etc. or in the case of penumbra imaging) and digital processing of the images obtained can be necessary to reconstruct the image of the source.

Acquisition of radiographic images of the source (or the object) at various angles allows reconstruction in three dimensions of the source (or the object) by digital fusion of the data provided by the various views (this technique is called tomography). This is the case, for example, with single photon emission computed tomography (SPECT).

Radiographic imaging has grown considerably since the discovery of X rays. Initially, radiographic films were coupled with reinforcing screens the function of which was to convert the radiation into light to facilitate recording thereof by the film. Films have progressively been replaced by light-sensitive electronic sensors (such as CCD (charge-coupled devices), photodiodes, etc.) and the reinforcing screens have been replaced by scintillators. Optical coupling between the scintillator and the electronic sensor is generally effected by lenses or optical fibers with a reduction of image size and/or amplification of light where appropriate.

U.S. Pat. Nos. 6,031,892 and 6,285,739, for example, describe devices using a scintillator crystal, a CCD sensor and coupling optics.

In radiographic imaging devices of this type, the quality of the images depends mainly on the sensitivity and the spatial resolution of the combination of the scintillator, the coupling optics and the image sensor and on the level of the flux of photons producing the signal. The ionizing radiation deposits energy in the scintillator which releases it in the form of light detected by the electronic image sensor. The level of noise in the image (and therefore the signal to noise ratio) are thus mainly a function of the density of the scintillator, the effective section of the material from which it is produced (vis à vis the type and energy of the ionizing radiation concerned), the number of light photons emitted by the scintillator per unit dose deposited in the material by the radiation (luminous efficiency), the transparency of the scintillator to its own light radiation, the optical coupling between the scintillator and the sensor and the performance of the sensor itself.

For its part the spatial resolution is directly linked to the thickness of the scintillator. The spatial enlargement of the signal in the scintillator reflects the spreading of the deposits of energy of the incident rays within it (phenomena of diffusion of electrons and secondary photons created by interaction of the radiation with the scintillator). The thicker the scintillator, the greater the spreading of the deposit of energy. Increasing the thickness of the scintillator increases the sensitivity and the signal to noise ratio of the image at the same time as degrading spatial resolution. It is therefore difficult to produce a device that is both sensitive and of high resolution. The difficulty increases with highly penetrating radiation because it is necessary to increase the thickness of the scintillator to capture a sufficient proportion of the incident rays and to achieve good detection quantum efficiency (DQE).

Scintillators can be classified into two main families: organic or plastic scintillators (for example phosphor screens) and scintillator crystals: CsI, NaI, germanate of bismuth (usually called BGO), silicates of lutecium (LSO, LYSO), and the like.

Scintillator crystals have an advantage over organic scintillators because, in most cases, their density and their effective section of interaction with the radiation are greater. The thicknesses to be used to achieve a given detection efficiency are significantly reduced by this and the spatial resolution improved. Moreover, some crystals have properties that are very useful for radiographic imaging: very short light emission, allowing fast and repetitive recordings, very high luminous efficiency, allowing losses in the optical coupling. Crystals that perform well are described for example in French patent no. FR 2 874 021 and European Patent Publication No. EP 1 754 981.

At present the technology for manufacturing these crystals offering very good performance (high density and high luminous efficiency), such as BGO, LSO and LYSO, do not allow plates to be produced with sufficient dimensions for routine applications (the typical requirement is 300×300 m², or even 400×400 mm²). LYSO and BGO, for example, can at present be obtained in plates having a uniform luminous efficiency and no major defects up to dimensions of approximately 60×60 mm² and 80×160 mm², respectively (and for thicknesses up to 30, or even 40 mm).

To produce large-format scintillators (exceeding 100×100 mm²) it is possible to use crystals of CsI or of NaI that are obtained with typical dimensions of 200×200 mm² and 400× 400 mm², respectively. However, numerous defects remain present in crystals of CsI and NaI with these dimensions and these crystals are more or less hygroscopic. Moreover, the performance of the imaging device is less good with crystals of CsI or of NaI than with more dense crystals (such as BGO, LSO, LYSO) for the reasons stated above.

U.S. Pat. No. 7,057,187 and French patent No. FR 2 625 332 describe radiographic imaging systems using a scintillator crystal (preferably of CsI) optically coupled to a CCD sensor for X-rays with an energy from 1 to 100 keV. The crystal thicknesses are respectively 50 µm and 1 mm. The thickness of the scintillator has been limited to preserve good spatial resolution, to the detriment of sensitivity. This leads to a degraded quality radiographic image, to an increase in the exposure time necessary to obtain a sufficient detection statistic, and to an increase in the power of the source. This can be harmful in the case of medical applications, for example, in which the dose received by the patient must be reduced to that strictly necessary. This can also represent a penalty for inspecting packages because for the system to be operational the immobilization time is decisive.

The publication "*A high quantum efficiency prototype video based portal imaging system*" by Samant et al., published in Journal of X-ray Science and Technology 14 (2006, pp. 161-175) gives an example of a CsI scintillator 12 mm thick and with an area of 170×170 mm² coupled to a CCD by means of a photographic lens. This device is limited by the available scintillator dimensions. Moreover, it is difficult to fabricate a large scintillator crystal without any imperfections in the bulk of the material. In the example cited, the crystal has approximately 20 to 30 imperfections (air bubbles) distributed randomly in the bulk of the scintillator. These defects diffuse the light generated by the scintillator and induce (unwanted) intensity peaks in the final image. However, to fabricate small and/or thin scintillators it is possible to select and to cut the crystal in portions free of defects.

Another known solution for producing large format scintillators is to use the segmentation technique, which allows good spatial resolution to be obtained at the same time as preserving sufficient sensitivity in high-energy radiographic imaging devices. This technique is routinely applied to scintillators of BGO, LSO, LYSO, $BaF_2$, type, and the like.

Using this technique, the face of the scintillator receiving the radiation is divided into small elements 50 (see FIG. 9) that are optically separate and which therefore each transmit the light generated within them (photons, generally in the visible range). Each element thus forms a light guide and the elements are assembled mechanically to form the scintillator 52 (FIG. 8).

In practice, the small elements 50 are separated by opaque walls in order to prevent the light produced in each of them from reaching the adjacent elements. The light can be guided toward the exit face 54 of the scintillator by treatment of the lateral faces 56 of the scintillator elements (the faces adjacent the similar other elements, see FIG. 9). This treatment is generally adapted to produce specular reflection (furthermore entailing polishing of the lateral faces of the segments) so as to optimize the luminous efficiency. The light pickup is often in contact with the scintillator and the optical coupling is effected over a large numerical aperture (for example in the case of coupling the scintillator to a block of optical fibers or to a photomultiplier). However, in the case of optical coupling over a smaller numerical aperture (in the case of a system using a CCD and a photographic lens), it is more suitable (and less costly) to encourage diffusion from the lateral faces of the segments to increase the luminous efficiency in the direction of the axis of the segments (see for example the paper by Quillin and Aedy, "*A pixelated BGO scintillator array for high energy flash radiography*", Nuclear Symposium Conference Record, IEEE 2004, Vol. 2, pp. 794-797.

The rear face 58 (opposite the light pickup) is for its part frequently treated to reflect light and increase the luminous flux directed toward the detector (this can be a metal deposit or simply white paint).

In some cases, lateral walls 60 are added between the scintillator elements 50 (see FIG. 10) to reduce the diffusion of secondary particles (for example electrons, photons). These walls generally consist of metal (aluminum, steel, tungsten).

The patents and patent applications U.S. Pat. No. 3,344,276, GB 2 167 279, GB 2 034,148, U.S. Pat. Nos. 5,773,829, 5,329,124, 6,344,649, US 2005/0104000, U.S. Pat. No. 7,238,945 describe segmented scintillators constructed in accordance with this principle.

The main drawback of segmented scintillator radiographic imagers is their cost, as they necessitate the laborious cutting and assembly of a very large number of elements as the pixel size must be close to the required spatial resolution. Moreover, it is difficult to obtain a perfectly regular assembly in which the sensitivity does not vary too much from one segment to another. Correcting these defects entails using subsequent digital image processing, of a more or less sophisticated nature, which induce a further loss of the quality of the final image (signal to noise ratio and effective resolution).

Finally, different structures have been proposed for optimizing the optical coupling between the scintillator and the sensor, the idea being to limit part of the spread of the light coming from the scintillator and to guide it toward the detector. U.S. Pat. Nos. 6,881,960 and 7,112,797 propose solutions with a one-piece scintillator semi-segmented over part of its thickness. U.S. Pat. No. 5,753,918 describes curved scintillator elements with reflecting or diffusing optical treatments. U.S. Pat. No. 6,737,103 proposes to add a matrix of optical microlenses to guide the light produced in the scintillator. These solutions increase the cost of the scintillator and do not solve the problem of large format crystalline scintillators. Moreover, as in segmented scintillators, this structuring leads to defects that are a problem in the radiographic images.

SUMMARY

An object of the present invention is to propose a radiographic imaging device based on a large scintillator module.

To this end in particular there is a proposed a scintillator for an imaging device, comprising a (first) plate of a first material able to emit photons as a function of an incident radiation, characterized in that the scintillator comprises at least one block (possibly produced in the form of a second plate) of a second material able to emit photons as a function of the incident radiation and in that the plate and the block are assembled by the edge surface of the plate by connecting means absorbing some or all of the photons emitted by the plate and the block (among those received at the level of the connecting means).

The photons considered here are light photons the spectrum of which corresponds to the range of wavelengths of the light re-emitted by the scintillator material, generally in the range of the visible spectrum.

The scintillator module is thus formed of an assembly of plates or blocks of scintillating crystals comprising at least one plate. The proposed solution enables production of a radiographic imaging device with a format larger than the limit on the fabrication dimensions of scintillating crystals essentially free of defects. It further enables a less costly alternative to be provided to the segmented detector approach, where appropriate at the same time as allowing production of radiographic imaging systems with a high stopping power and good spatial resolution.

By definition, the plate or plates have one relatively small dimension (the thickness of the plates), always less than the other two general dimensions of the plate; in practice, the thickness is generally less than half the smaller of the other two dimensions (and thus less than half each of the other two dimensions). Also by definition, the edge surface of each plate corresponds to the faces of the plate oriented thickness-wise, i.e. along an axis perpendicular to the two larger faces of the plate (optical faces).

The plates or blocks are generally of parallelepiped shape but different shapes can be used (for example hexagonal blocks). It is also possible to produce curved (for example cylindrical) scintillators by assembling plates or blocks having some curvature.

The use of assembly (or connection) means that are absorbent for the photons concerned (in particular for the light re-emitted by the scintillator material) prevents any harmful consequence on the image generated by the device of the assembly and linked to the presence of a joint plane. The coefficient of absorption vis à vis light photons emitted by the scintillator is in practice at least 50% over the thickness of the connection, in particular in a direction essentially perpendicular to the edge surface of the assembled plates.

The connecting means can even have an absorption coefficient of at least 90% over the thickness of said connection, enabling the diffusion of light at the joint planes to be very greatly reduced.

Generally speaking, the absorption percentage can be adapted as a function of the application concerned in such a way as to generate the required signal level at the location of the joint, for example by choosing the composition of the connecting means as explained hereinafter. It is, inter alia, possible to obtain a signal level at the level of the joint close to the average signal produced by the scintillator as a whole.

In practice the second material is generally identical to the first material, although in some applications it is possible to use two different materials.

In one embodiment that can be envisaged, the first material is a crystal the light re-emission properties of which are beneficial as already explained. In this case, it can be a material with a density exceeding 5 g/cm$^3$. Such crystals have a high stopping power and therefore give beneficial results in the application considered here. Alternatively, these could be organic or plastic scintillator materials.

In the embodiment proposed and described hereinafter, the connecting means comprise a glue that is absorbent in at least part of the visible spectrum. This absorbent glue includes a coloring agent additive, for example, such as a colloidal carbon powder.

The invention also proposes a scintillator module comprising a scintillator as just referred to and a (relatively rigid) structural member essentially parallel to one of the two large faces of the (first) plate (preferably the entry face) and assembled to that face of the (first) plate and to a face of the block at least. A module is obtained in this way that is sufficiently rigid for practical applications.

The invention also proposes a scintillator module comprising a scintillator as referred to above or a scintillator module as just referred to above and a structural frame around the scintillator (or the scintillator module referred to above where appropriate) in such a manner as to position and stiffen the scintillator. The frame thus serves as a mechanical interface.

The invention thus proposes an imaging device comprising a scintillator as described hereinabove, an image sensor and optical means for coupling the scintillator to the sensor. In this device, the (first) plate and the block (where applicable in the form of a second plate) are each adapted to form an image (comprising a plurality of pixels) intended for the sensor.

For example, the dimensions of the plate and those of the block oriented in the plane of the plate (in particular parallel to the two larger faces of the plate or perpendicular to the direction of the thickness of the plate) are greater than ten times the spatial resolution of the imaging device in the plane of the scintillator, such that each plate or block forms for the sensor an image comprising more than 10 pixels in each dimension. In practice, each plate or block even corresponds frequently to more than 50 pixels of the sensor in each dimension.

The optical means can thus collect the photons emitted in a direction essentially perpendicular to the plane of the (first) plate.

The optical coupling between the scintillator and the sensor can be produced with a small object numerical aperture, namely an aperture in general of less than 20 degrees half-angle. The object numerical aperture can even be less than 5 degrees half-angle.

The invention finally proposes a scintillator manufacturing method, characterized in that it comprises the following steps:

formation of a (first) plate of a first material able to emit photons as a function of an incident radiation and of a block (possibly produced in the form of a second plate) of a second material able to emit photons as a function of the incident radiation;

assembly of the (first) plate and of the block (in particular, where applicable the second plate) by the edge surface of the (first) plate with interposition of absorbent connecting means.

The connecting means can also be compressible and the method can comprise a step of applying pressure in a direction parallel to the plane of the (first) plate.

As already mentioned, there can further be envisaged a step of assembling a structure element essentially parallel to one of the two large faces of the plate with that face of the plate and with one face of the block.

BRIEF DESCRIPTION OF DRAWING

Other features and advantages of the invention will become apparent in the light of the following description, given with reference to the appended drawings, in which.

DETAILED DESCRIPTION

Figure 1:
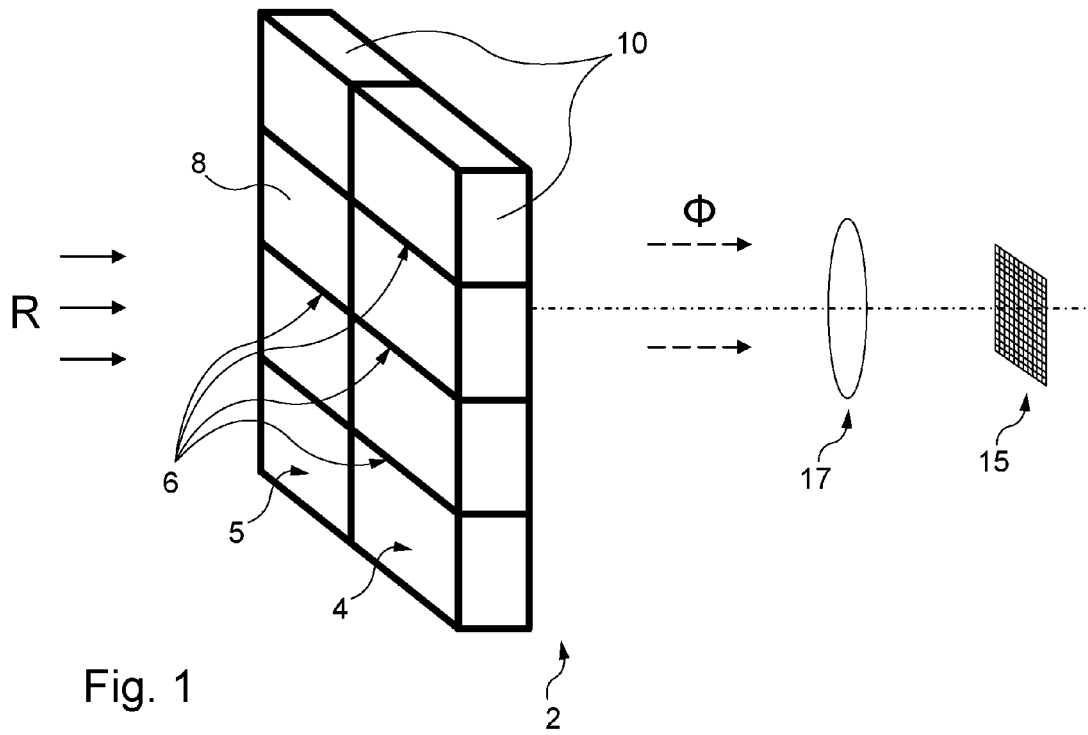
FIG. 1 is a theoretical diagram of a radiographic imaging device of the invention.

There is described with reference to FIG. 1 a method of assembling crystals together to form a scintillator module 2. The embodiment of the method described here includes the following steps:

The elementary plates (or blocks) 4, 5 are cut from the same solid crystal (or come from the same production series) in order to have the same luminous efficiency and to enable the fabrication of an imager of uniform sensitivity across the whole of its surface. The elementary plates (or blocks) are also optically polished on all faces and are of the same thickness to limit the sources of diffusion of light in the finished module. Particular care is given to polishing the faces (edge surfaces) of the plates intended to be stuck together as described hereinafter: in particular, care must be taken not to break/chamfer the edges of these faces when polishing to avoid producing, in the assembled module, interfaces with too great an apparent thickness.

An appropriate glue is chosen as a function of the scintillator material: it must allow good adhesion to the selected material but must also be sufficiently fluid to allow gluing of the elementary plates (or blocks) in a press in order to minimize the thickness of the glue joints (and thus of the interfaces between the plates or blocks). LOCTITE® 326 glue can be suitable, for example.

Generally speaking, glues available off the shelf are not absorbent. The selected glue is therefore mixed with a coloring agent additive the role of which is to absorb the light photons produced by the scintillator. This additive can be a fine powder of colloidal carbon, for example (of the same type as that used for photocopier and printer toner) to render the glue sufficiently absorbent without modifying its gluing performance too much. Adding carbon powder at the rate of a few percent by volume is generally sufficient to give the glue the expected optical properties.

The glue rendered absorbent is deposited on the edge surfaces of the plates 4 to be assembled.

The assembly by gluing is effected in a press (applying a light pressure simply intended to expel a maximum of glue and to minimize the thickness of the joint) and the excess glue is cleaned off before polymerization. In the case of assembling crystals over a length of 10 to 15 cm (and over a thickness from one to a few centimeters), it is possible to produce glue joints 6 of 100 to 200 μm thickness, for example.

Note that, although the scintillator crystals forming the module described above are of the same kind (with the advantages indicated), it is alternatively possible to create a scintillator module consisting of crystals of different natures.

There is described next with reference to FIGS. 1 to 3 a treatment that can be envisaged for the rear face 8 and the lateral faces 10 of the module with a view to optimizing the resolution and the luminous uniformity (the homogeneity of luminous efficiency) of the scintillator module.

Where the lateral faces 10 of the module 2 are concerned, in order to preserve good image uniformity at the edges (via the uniform spatial luminous efficiency), it is proposed to render them absorbent, only slightly diffusing and opaque in order to limit edge effects. This result is obtained by optical polishing of the lateral faces 10 to which matte black paint (or any other absorbent and opaque coating) is applied.

Figure 2:
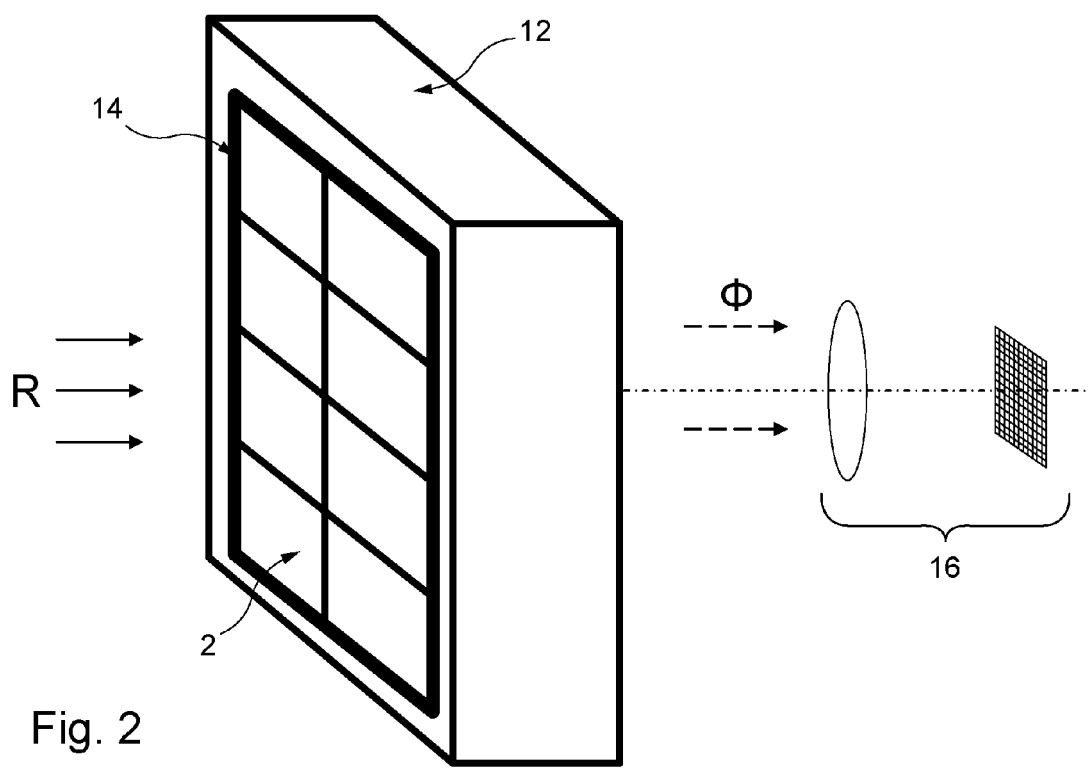
FIG. 2 shows an embodiment that can be envisaged for the device from FIG. 1, using a rigid frame.
Figure 3:
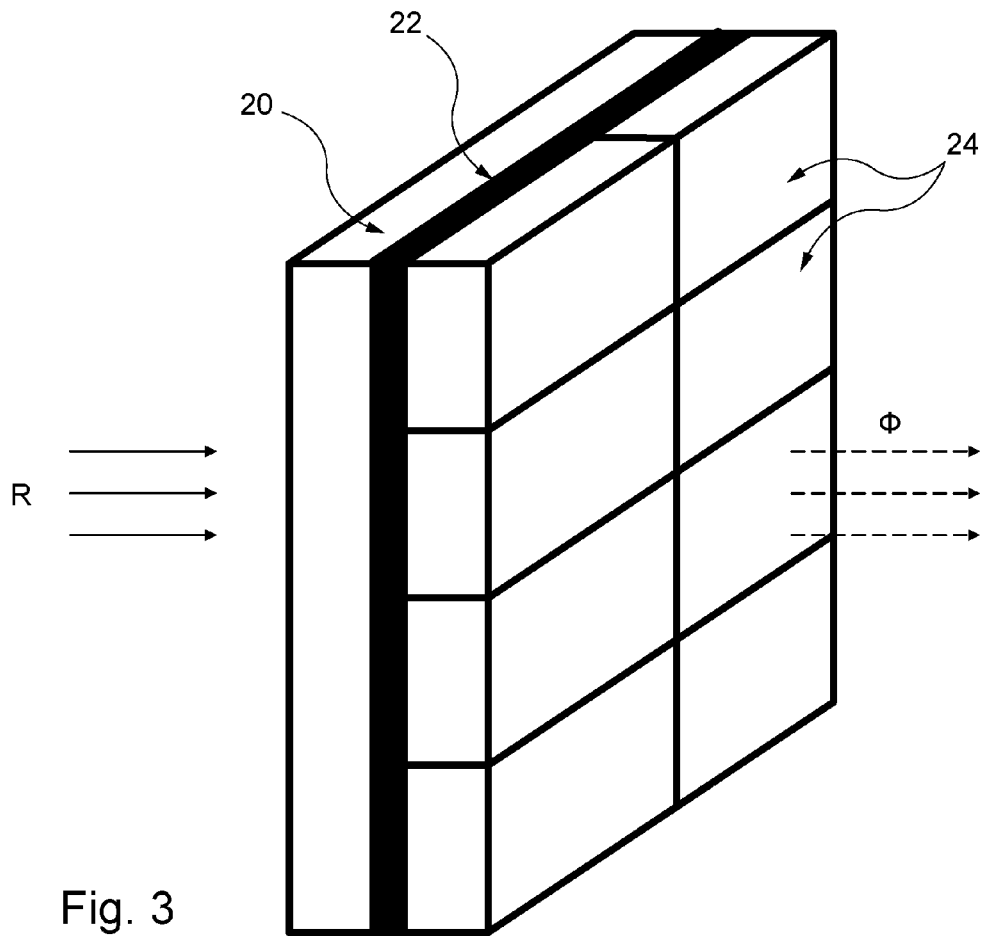
FIG. 3 shows an embodiment that can be envisaged for the thin scintillator module of the device from FIG. 1.

In the case of an industrial product, it is generally necessary as shown in FIG. 2 to glue the module into a rigid support/frame 12 (in plastic or metal) which can where appropriate serve as a connection with the image acquisition system 16. Where appropriate, it is then necessary to modify the optical properties of the glue (or the elastomer) used by incorporating colloidal carbon powder into it by the same method as described for gluing the crystals together. The glue or elastomer joint 14 does not necessarily need to be thin on these lateral faces 10 and it can even be useful to use a thick flexible glue joint 14 to decouple any shock and vibration transmitted to the crystal. In particular, if the module 2 is intended for use in an environment causing high shock or vibration (for example aerospace applications), it can where applicable be envisaged not to polish the external faces of the assembly (leaving them rough sawn) to encourage the adhesion and the strength of the glue. Although the roughness of the edge will then induce light diffusion and the glue joint 14 will appear brighter than the mass of the crystal, this defect is acceptable in applications in which the useful image is centered on the detector and little useful information is to be found at the edges of the image.

One way to improve on this method is, after gluing, to repolish the entry and exit faces of the scintillator (perpendicular to the joint plane) in order to reduce the thickness of glue near the surface. This thickness tends to increase because of residual micro-chamfers or micro-flaking on the edges of the plates and blocks.

Finally, as shown in FIG. 1, the rear face 8 of the module (situated on the side opposite the electronic image sensor) must, on the one hand, be opaque so that the sensor does not detect ambient light sources that can be observed through the crystal and, on the other hand, be absorbent so as not to degrade the resolution of the system (by reflection of light in the direction of the detection optics). Fitting a matte black screen (for example a sheet of thick matte black paper the black color and the rough surface of which fill the function effectively) is a beneficial solution. The application of a matte black paint to the rear face 8 of the scintillator is also possible but of less benefit from the efficacy point of view: the finish of the layer of paint (image sensor side) would be perfectly smooth given the optical polish of the crystal (which is necessary to guarantee good uniformity of the image produced) and the coating would therefore retain a brilliant appearance, which would limit the expected absorbing power.

To produce a large but thin (typically less than 3 to 4 mm thick) scintillator module, it is moreover proposed here to use a structure 20 (for example in plate form) adapted to maintain good stiffness of the set of scintillator material plates. For example, the rear face of the scintillator must therefore be stuck to a structuring element 20 as shown in FIG. 3 that does not interfere too much with the performance of the system and the material of which must be chosen as a function of the ionizing radiation concerned. For example, in the case of X rays or gamma rays, metals must be avoided because they introduce attenuation of the radiation (which can be considerable for the lowest energies) and produce, as a result of the radiation, electrons that interact with the scintillator and partially degrade the spatial resolution of the system. A material of low density that does not luminesce because of the radiation would be more suitable (such as Delrin®, for example, which is a polyoxymethylene). As it is necessary to glue the assembled crystals to the structural plate 20 (and the use of the matte black screen is therefore not possible in this case), it is preferable to do this with an opaque and absorbent glue or elastomer 22, as described above for gluing the external faces of the assembly to a metal frame.

One example of integration of such a scintillator into an imaging device using a CCD sensor is described next.

Figure 4:
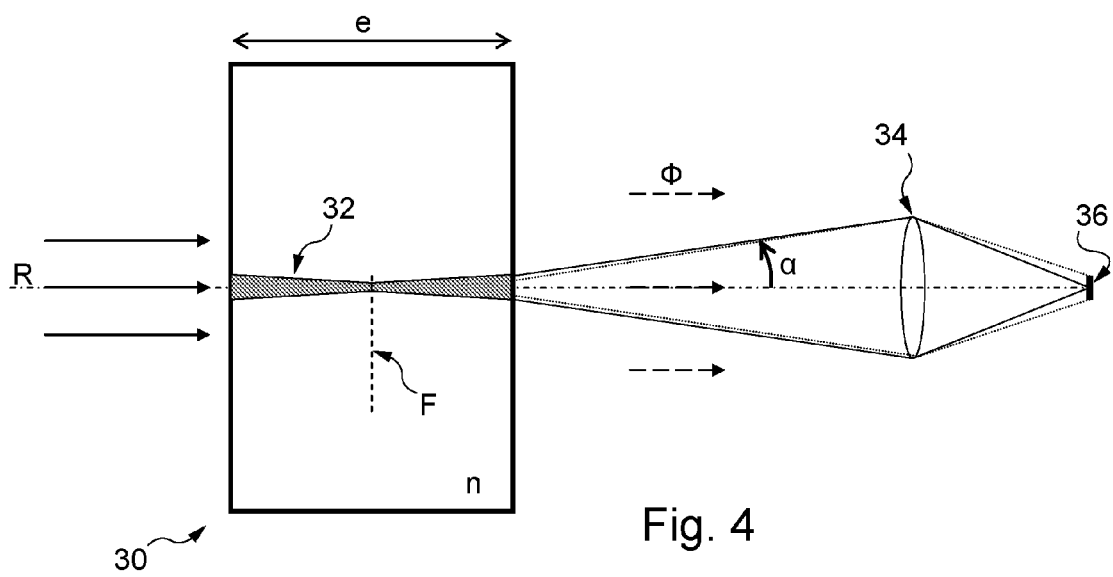
FIG. 4 shows the essential elements of the optical part of the device from FIG. 1.
Figure 5:
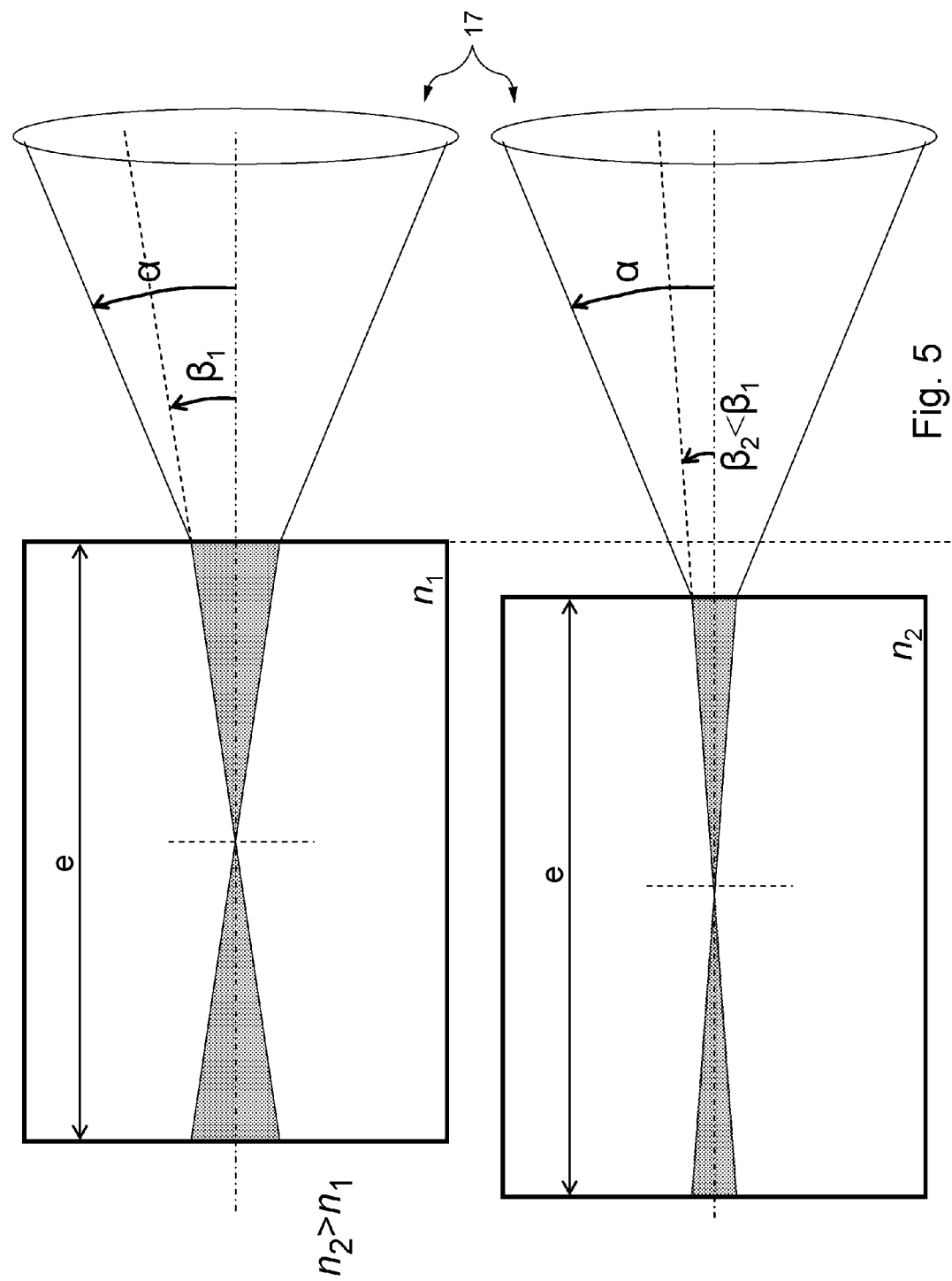
FIG. 5 compares two scintillators with different indices.

Generally speaking, if the scintillator module 30 is coupled to an image sensor over a small numerical aperture, for example, by means of a CCD sensor 15 and a photographic lens 17, 34 (as shown in FIG. 1 and as shown in more detail in FIG. 4), the use of thick (multicentimeter) modules allows the detection quantum efficiency of the system to be increased without commensurately degrading the resolution of the system to an unacceptable degree (it remains from one millimeter to a few millimeters). A number of parameters contribute to limiting the resolution of the system in such a device and in particular the two dominant factors are the spread of the deposit of energy in the scintillator and the size of the voxel 32 (the elementary volume observed by a CCD pixel 36). The dimensions of the voxel 32 depend on the optical index n and on the thickness of the scintillator, the object numerical aperture a of the lens 34 (and its resolution) and the size of the CCD pixel 36, as shown in FIG. 4. The radial dimension of the voxel 32 at the entry and exit faces of the crystal decreases as the value of the optical index of the crystal increases. FIG. 5 shows the coupling of given optics with crystals of the same thickness but different indices $n_1$ and $n_2$ for a fixed object numerical aperture $\alpha$.

To minimize the size of the voxel observed by a CCD pixel 36 and thereby to produce an imager with good resolution, this scintillator module must be coupled to an image sensor (for example a CCD sensor) with an optical pickup that collects the light emitted by the module over a small object numerical aperture, typically of the order of 5 degrees half-angle (denoted a in FIGS. 4 and 5) for modules of multicentimeter thickness.

This type of coupling is easily obtained with an off the shelf photographic lens, for example, the aperture diameter of which is typically less than 8 cm, provided that the lens and the CCD sensor are placed at a sufficient distance from the scintillator module (for example, for a lens the aperture diameter of which is 8 cm, the lens must be placed at a distance of more than 45 cm to observe the module over an object numerical aperture of less than 5 degrees half-angle).

However, this coupling configuration reduces the quantity of light photons reaching the CCD sensor. For a given application, limiting this distance between the scintillator module and the coupling optics to the minimum value acceptable for the required resolution and selecting a CCD sensor the sensitivity of which enables this low light collection efficiency to be compensated can be envisaged. If the radiation levels to be detected are very low, it can even be necessary to select a sensor provided with a photomultiplier or to use a cooled or amplified sensor. A photomultiplier can also be necessary because of its fast shutter function, but its presence will contribute to a significant reduction in the resolution of the system. Dense crystals (which therefore have a high stopping power) with a high luminous efficiency referred to above are also indicated for detecting low radiation levels.

To optimize the resolution of the system as a whole, the object plane of the lens 34 (focal plane F) must be located inside the scintillator module. The optimum position depends on numerous parameters: scintillating crystal index, object numerical aperture of the lens (parameter $\alpha$ in FIG. 4), size of the pixel 36, magnification and resolution of the lens 34, spreading of the deposit of energy in the scintillator (for the ionizing radiation concerned), and the like. In practice, if the crystal thickness has been adapted to suit the radiation concerned (in particular, thick enough to stop a sufficient percentage of isolating particles but not too thick, to limit the loss of resolution of the device), an optimum configuration of the first order is to dimension the system so that the lens focus is right in the middle of the volume of the scintillating module (see FIG. 4).

The magnification of the optical pickup (selected via the focal length of the lens) must make it possible to minimize the impact of the joint plane formed by the absorbent glue deposited between the plates constituting the scintillator by projecting it onto a small number of pixels: for example, a standard off the shelf photographic lens enables the observed scene to be made smaller by a number of integer factors in order to project it onto a field suitable for 24×36 mm films. The typical size of a consumer grade CCD pixel being around 10 μm and the dimension of the glue joint of the order of 100 to 200 μm, a size reduction by a factor of 5, for example, makes it possible to reduce the impact of the joint plane to around 2 to 4 pixels in a CCD sensor.

The system as described makes it possible to produce a radiographic imaging device using a large scintillator module consisting of an assembly of a number of scintillating crystal plates (or blocks), limiting the effect on the final radiographic image of the interfaces between the assembled crystals.

The manufacturing method described hereinabove makes it possible to obtain a scintillator in which the quantity of light coming from the glue joint (and thus the signal at the level of the glue joint) is minimized. If it is necessary to obtain radiographic images in which the glue joints are not (or virtually not) apparent, it is generally possible to achieve this by choosing the appropriate proportion of colloidal carbon powder and glue in such a manner as to generate the same signal level at the location of the joint as the mean signal produced by the crystal. Note that the proportion of the mixture depends on the complete system in its definitive optical configuration, in particular the thickness of the crystal, its nature and the resolution of the optical system and the sensor. To determine it, it is possible for example to proceed to various gluing tests on small samples of crystals (of a thickness representative of the final thickness of the assembly) and to characterize them by means of the source of radiation under the final conditions of use (i.e. with the selected lens and sensor). To save time in such experiments, it is recommended to carry out tests on the mixture of carbon powder and glue and to observe its transparency visually before carrying out the tests. A mixture of semi-transparent appearance is a good starting indicator.

Note that, generally speaking, it is preferable to use at least one mirror between the scintillator module and the optical system (lens and CCD) to place the CCD outside the radiation flux (and also the optics of the lens that could emit light by the Cerenkov effect for some types and energies of radiation). Moreover, the mechanical structure that encapsulates and positions all the components of the radiographic system must be sealed to external light and its interior walls must be painted with matte black paint to attenuate any unwanted reflection of light in the direction of the CCD.

Figure 6:
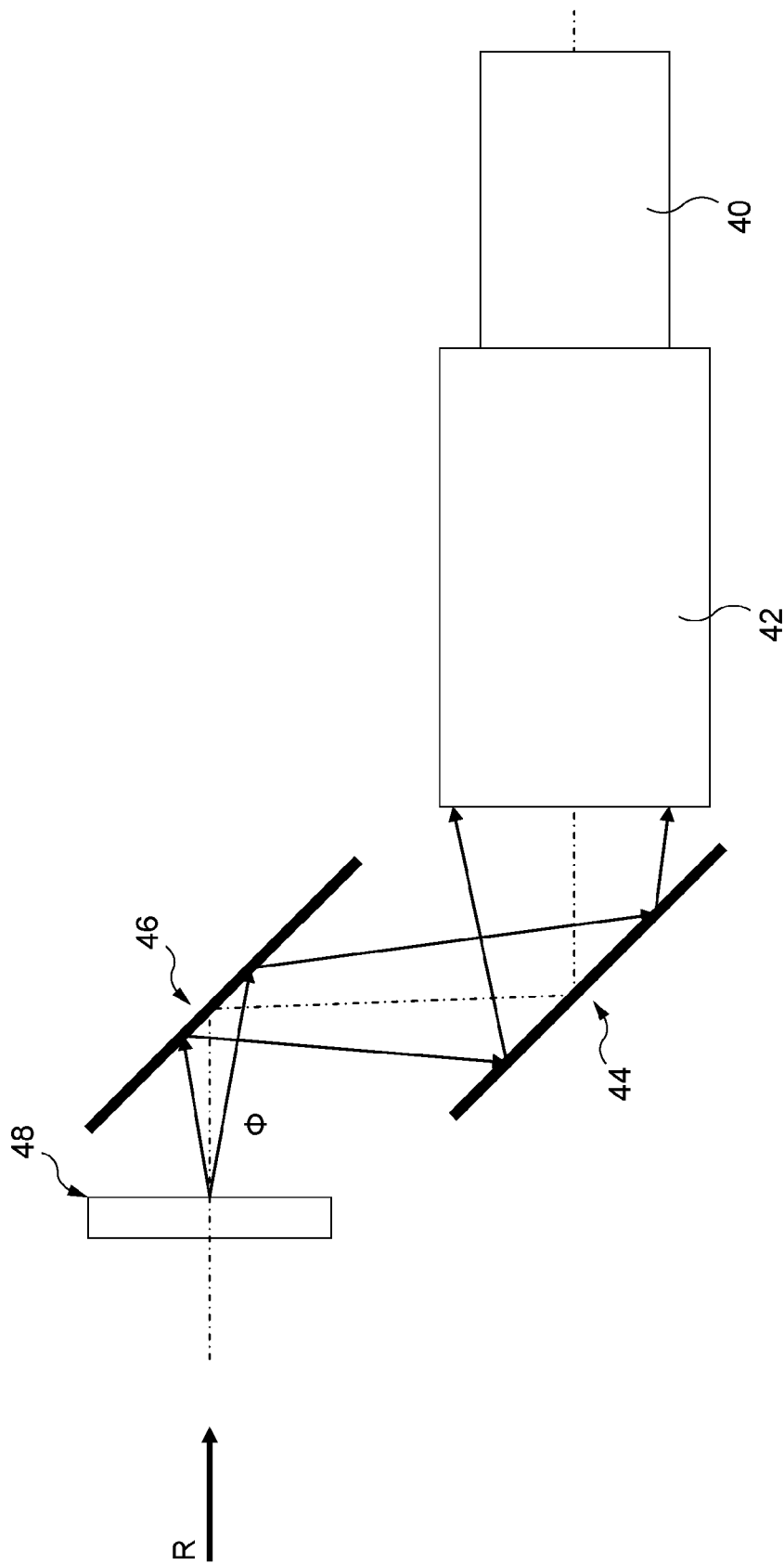
FIG. 6 is a general diagram of the device from FIG. 1.
Figure 7:
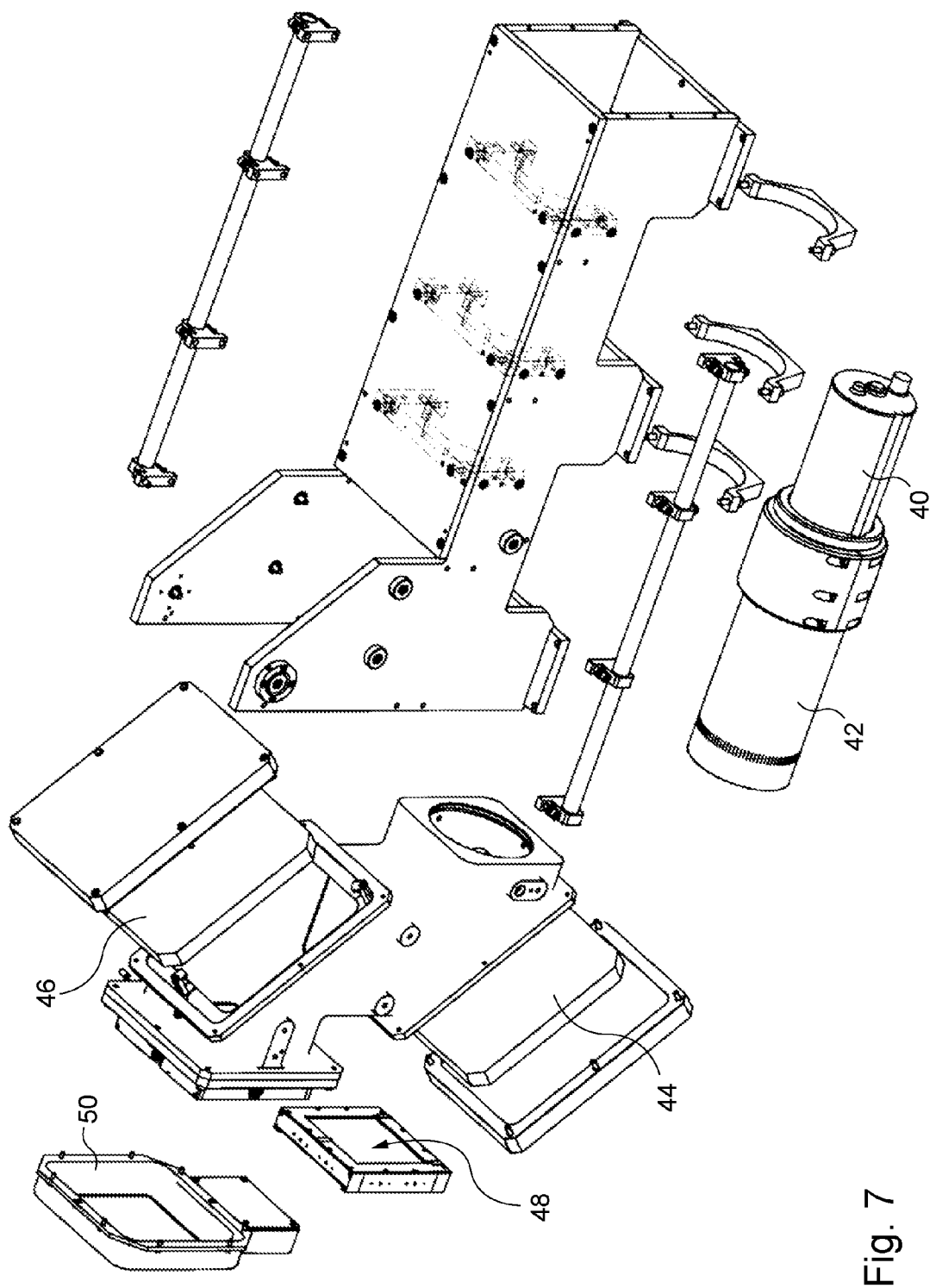
FIG. 7 is an exploded view of the actual components employed in the FIG. 6 example.
Figure 8:
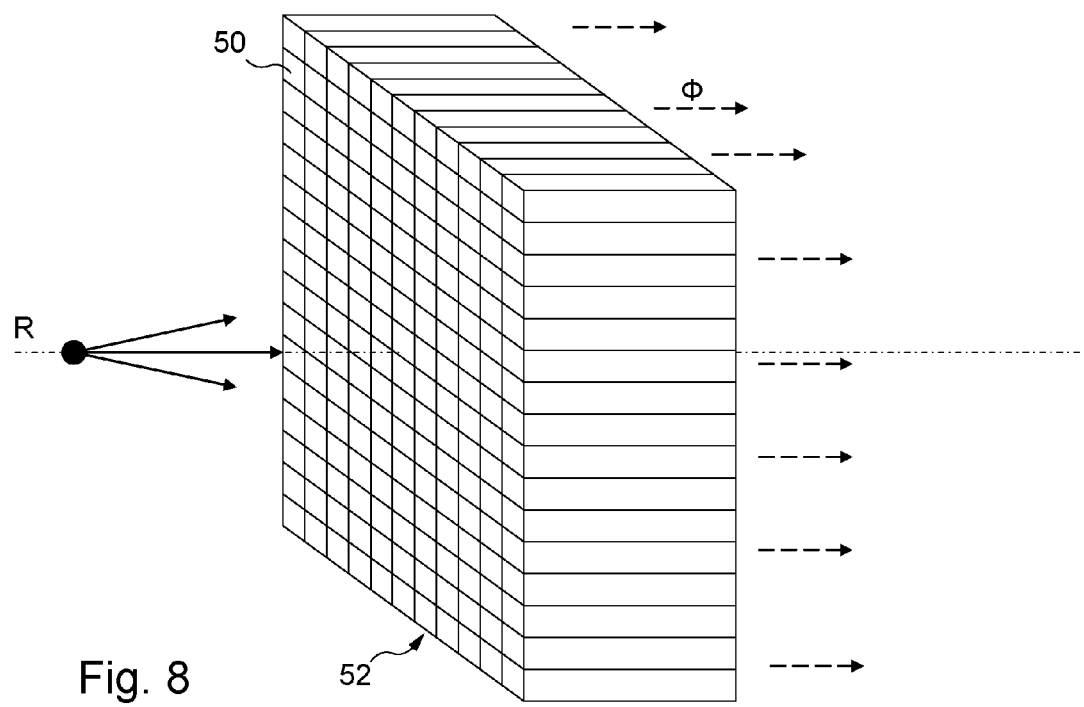
FIGS. 8 to 10, show the known technique of segmented scintillators.
Figure 9:
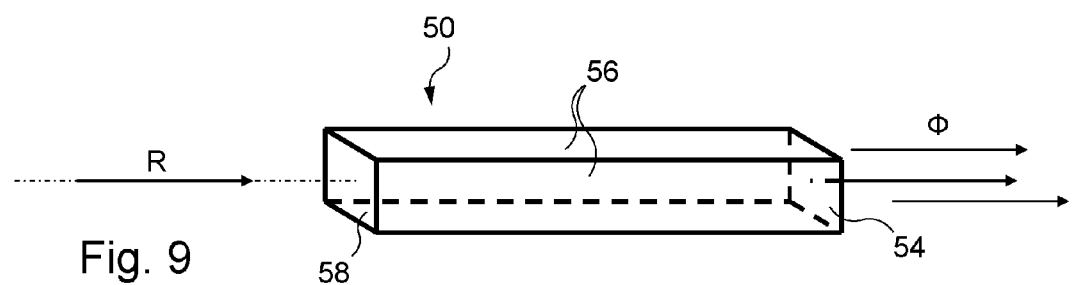
Figure 10:
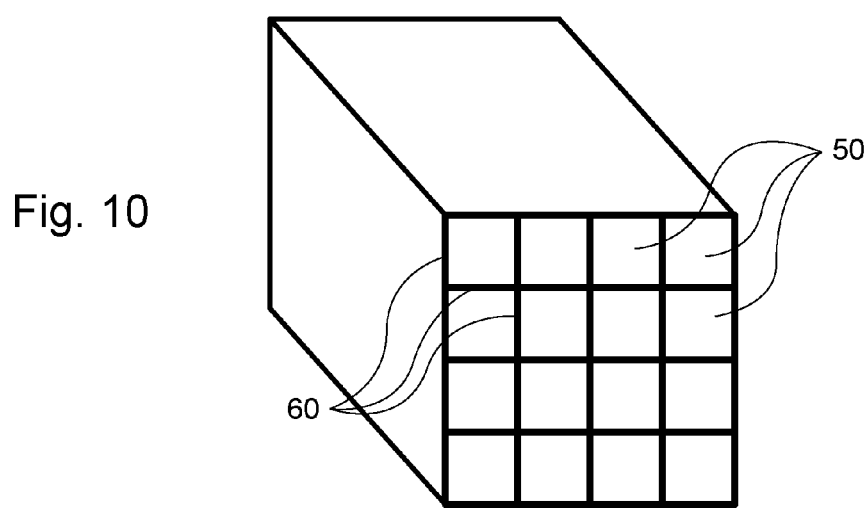

A practical embodiment of the object that has just been described is therefore described next with reference to FIGS. 6 and 7, consisting of the following elements:

A BGO scintillator 165×165 mm² and 10 mm thick consisting of two plates 82.5×165×10 mm³ assembled by the method described hereinabove.

A CCD camera 40 of the LN/CCD-2048SB/2 type manufactured by the company ROPER SCIENTIFIC and provided with an SiTe Si-424A matrix with a side length of 49 mm, made up of 2048×2048 pixels with a side length of 24 μm. This thinned matrix is back-lit (thereby increasing its sensitivity in the visible range by a factor of 2) and cooled by liquid nitrogen.

An image pickup lens 42, made up of seven lens elements, has been produced under the reference XCRL 162 by the company LINOS in the United States (distributed in France by Schneeberger).

Two mirrors 44, 46 for offsetting the CCD outside the ionizing flux.

The entry orifice, in which the scintillator modulator 48 is placed, is protected by an aluminum alloy (AS7G) cover 50 the thickness of which is 7 mm over the whole of the usable field of the camera.

The main specifications of the CCD camera are as follows: quantum efficiency greater than 65% between 400 and 600 nm, departure from linearity less than 1% over the whole of the dynamic range, nominal operating temperature: −100° C., darkness current: 12 e−/pixel/hour at −100° C., read noise: 6.6 e− at 50 kHz, dynamic range 9280 at S/N=1 and 6500 at S/N=10, CCD matrix read frequency: 50 kHz, matrix reading time (at 50 kHz) 84 seconds, electronics conversion factor: 1.24 e−/LSB.

The main specifications of the lens are as follows: intended range of use: from 420 nm to 600 nm wavelength, object field diameter: 270 mm, focal distance: 162 mm, object distance: 840 mm, image distance: 19 mm, magnification: −0.258, effective aperture number (CCD side): 1.79, contrast: 86% for a test pattern with a pitch of 4 pl/mm, distortion: less than 0.1%, transmission at 490 nm wavelength: 86%, lens length: 392 mm, lens outside diameter: 190 mm, anti-reflection treatment: for wavelengths between 420 and 560 nm, usable diameter of entry lens (scintillator side): 122 mm.

The foregoing embodiments are merely examples that can be envisaged for implementing the invention, which is not limited to them.

The invention claimed is:

1. A scintillator for an imaging device having an image sensor, comprising
a plate of a first material able to emit, as a function of an incident radiation (R), photons to be collected in a direction essentially perpendicular to a plane generally defined by the plate, wherein the scintillator comprises
at least one block of a second material able to emit photons ($\phi$) as a function of the incident radiation (R) and wherein
the plate and the block are assembled at an edge surface of the plate by a connecting element that absorbs some or all of the photons ($\phi$) emitted by the plate and the block, wherein the connecting element has an absorption coefficient of at least 50% over the thickness of the connecting element.

2. The scintillator according to claim 1, wherein the thickness of the plate is less than half each of the other two dimensions of the plate.

3. A scintillator for an imaging device comprising:
a plate of a first material able to emit photons as a function of an incident radiation,
at least one block of a second material able to emit photons as a function of the incident radiation and wherein
the plate and the block are assembled at an edge surface of the plate by a connecting element that absorbs some or all of the photons emitted by the plate and the block, wherein the connecting element has an absorption coefficient of at least 50% over the thickness of the connecting element.

4. The scintillator according to claim 3, wherein the second material is identical to the first material.

5. The scintillator according to claim 3, wherein the first material comprises a crystal.

6. The scintillator according to claim 5, wherein the first material comprises a material having a density greater than 5 g/cm$^3$.

7. The scintillator according to claim 3, wherein the connecting element has an absorption coefficient of at least 90% over the thickness of the connecting element.

8. The scintillator according to claim 3, wherein the connecting element comprises a glue absorbing at least part of the visible spectrum.

9. The scintillator according to claim 8, wherein the absorbing glue includes a coloring agent additive.

10. The scintillator according to claim 9, wherein the additive comprises a colloidal carbon powder.

11. The scintillator according to claim 3, wherein the block is produced in plate form.

12. A scintillator module comprising a scintillator according to claim 3 and a structuring element essentially parallel to one of two large faces of the plate and assembled to a face of the plate and to a face of the block.

13. The scintillator module according to claim 12 further comprising a structural frame gripping the scintillator module.

14. The scintillator according to claim 3 further comprising a structural frame gripping the scintillator.

15. The scintillator according to claim 3, wherein a thickness of the plate is less than half each of the other two dimensions of the plate.

16. An imaging device comprising a scintillator, an image sensor and an optical device for coupling the scintillator to the sensor, the scintillator comprising:
a plate of a first material able to emit photons as a function of an incident radiation,
at least one block of a second material able to emit photons as a function of the incident radiation,
wherein the plate and the block are assembled at an edge surface of the plate by a connecting element that absorbs some or all of the photons emitted by the plate and the block, wherein the plate and the block are each able to form an image intended for the sensor and wherein the optical device collects the photons emitted in a direction essentially perpendicular to a plane generally defined by the plate, and
wherein the connecting element has an absorption coefficient of at least 50% over the thickness of the connecting element.

17. The imaging device according to claim 16, wherein dimensions of the plate and dimensions of the block perpendicular to the edge surface of the plate are greater than ten times a spatial resolution of the imaging device in a plane of the scintillator.

18. The imaging device according to claim 16, wherein the optical coupling device for coupling the scintillator to the sensor comprises a device having a low object numerical aperture.

19. The imaging device according to claim 18, wherein the object numerical aperture is less than 5 degrees half-angle.

20. The imaging device according to claim 16, wherein a thickness of the plate is less than half each of the other two dimensions of the plate.

21. A method for manufacturing a scintillator comprising the following steps:
forming a plate of a first material able to emit photons as a function of an incident radiation and a block of a second material able to emit photons as a function of the incident radiation, the plate having two larger faces parallel to a plane and an edge surface perpendicular to the larger faces; and
assembling the plate and the block by the edge surface of the plate with interposing an absorbent connecting element,
wherein the connecting element has an absorption coefficient of at least 50% over the thickness of the connecting element.

22. The method according to claim 21, wherein the connection element comprises a compressible material and further comprising applying a pressure in a direction parallel to a plane of the plate.

23. The method according to claim 21 or 22, further comprising a step of assembling a structuring element essentially parallel to one of two large faces of the plate with that face of the plate and with one face of the block.

24. The method according to claim 21, wherein a thickness of the plate is less than half each of the other two dimensions of the plate.

* * * * *